United States Patent [19]

Ming

[11] Patent Number: 5,785,337
[45] Date of Patent: Jul. 28, 1998

[54] PROPULSION SYSTEM FOR A BICYCLE

[76] Inventor: Kuan Shang Ming, Flat F, 19/F, Blk. 9 Hoi Kwun Mansion, Rivera Garden Tsuen Wan, N.T., Hong Kong

[21] Appl. No.: 679,855

[22] Filed: Jul. 15, 1996

[51] Int. Cl.[6] .................................................. B62M 1/04
[52] U.S. Cl. ..................................... 280/255; 280/251
[58] Field of Search ................................ 280/251, 252, 280/253, 255, 258

[56] References Cited

U.S. PATENT DOCUMENTS

| | | | |
|---|---|---|---|
| 3,759,543 | 9/1973 | Clark | 280/255 X |
| 3,984,129 | 10/1976 | Hege | 280/251 |
| 4,108,459 | 8/1978 | Alvigini | 280/258 X |
| 4,227,712 | 10/1980 | Dick | 280/255 X |
| 4,272,096 | 6/1981 | Efros | 280/255 |
| 4,300,784 | 11/1981 | Efros | 280/255 |
| 4,421,334 | 12/1983 | Efros | 280/255 X |
| 4,574,649 | 3/1986 | Seol | 280/255 X |
| 4,630,839 | 12/1986 | Seol | 280/255 |
| 4,666,173 | 5/1987 | Graham | 280/255 |
| 5,121,654 | 6/1992 | Fasce | 280/255 X |
| 5,335,927 | 8/1994 | Islas | 280/255 |

*Primary Examiner*—Kevin Hurley
*Attorney, Agent, or Firm*—Hill & Simpson

[57] ABSTRACT

A propulsion system for a bicycle is disclosed. The propulsion system includes first and second levers pivotly mounted to the frame of the bicycle and the cyclist operates the bicycle by pushing the first ends of the levers in up and down directions. In one embodiment, a translation mechanism is connected to the second ends of the levers for translating the up and down movement of the levers into rotational movement of the rear wheel of the bicycle. In another embodiment, an additional translation mechanism is connected to the first ends of the levers for translating up and down movement of the first ends of the levers into rotational movement of the rear wheel of the bicycle.

12 Claims, 8 Drawing Sheets

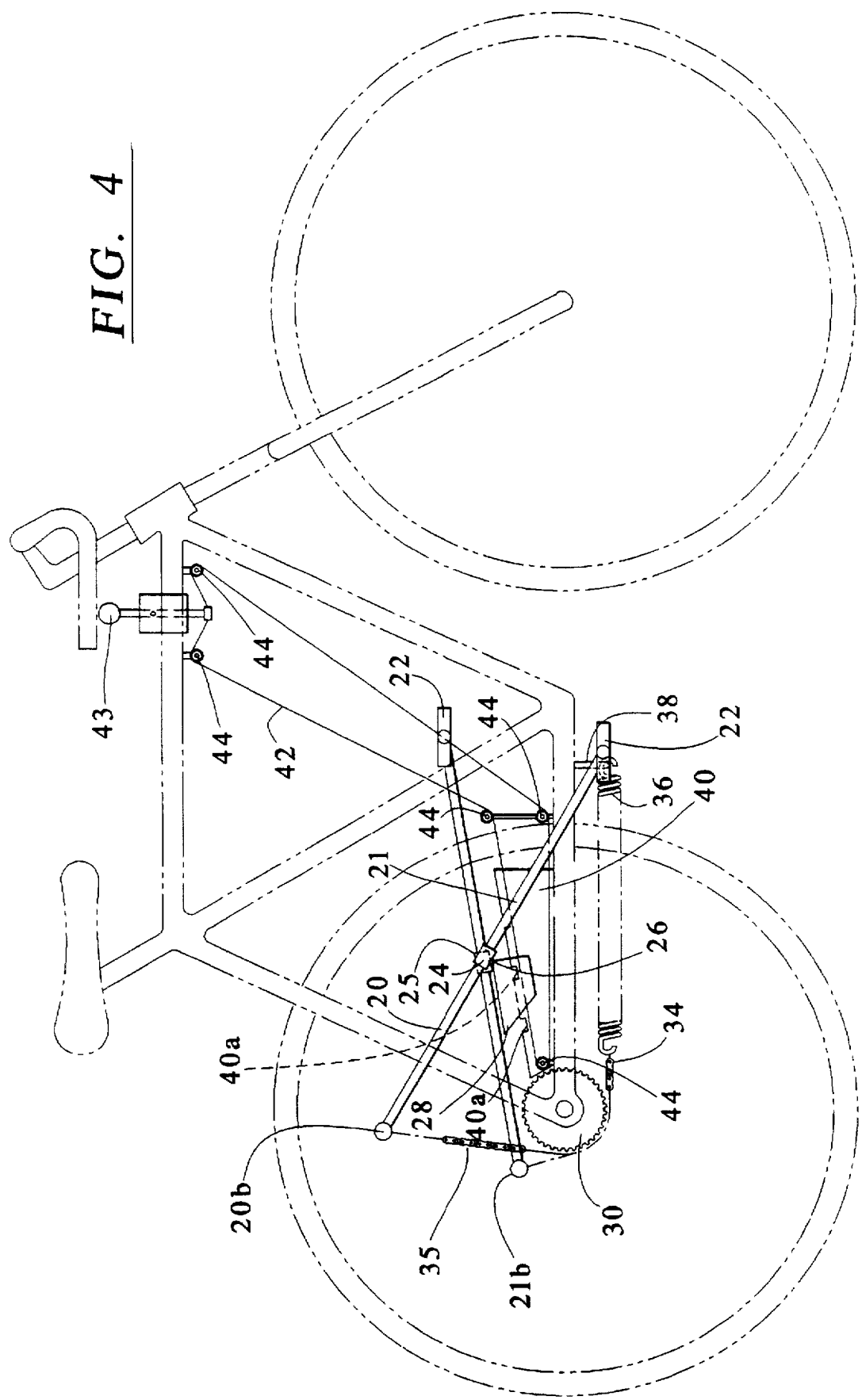

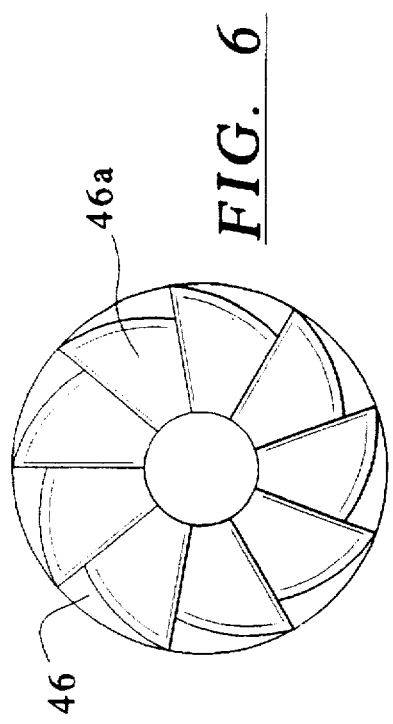
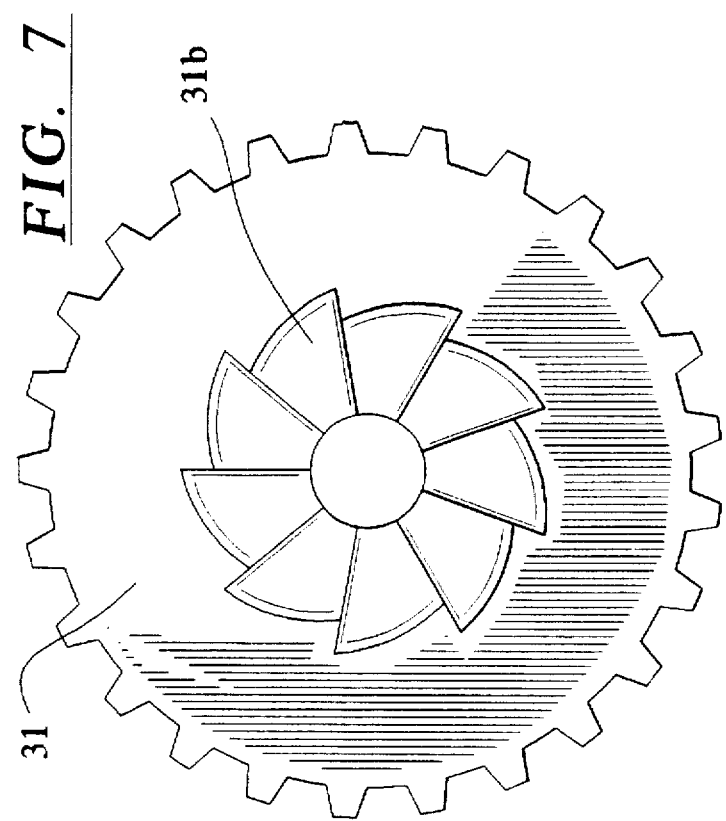
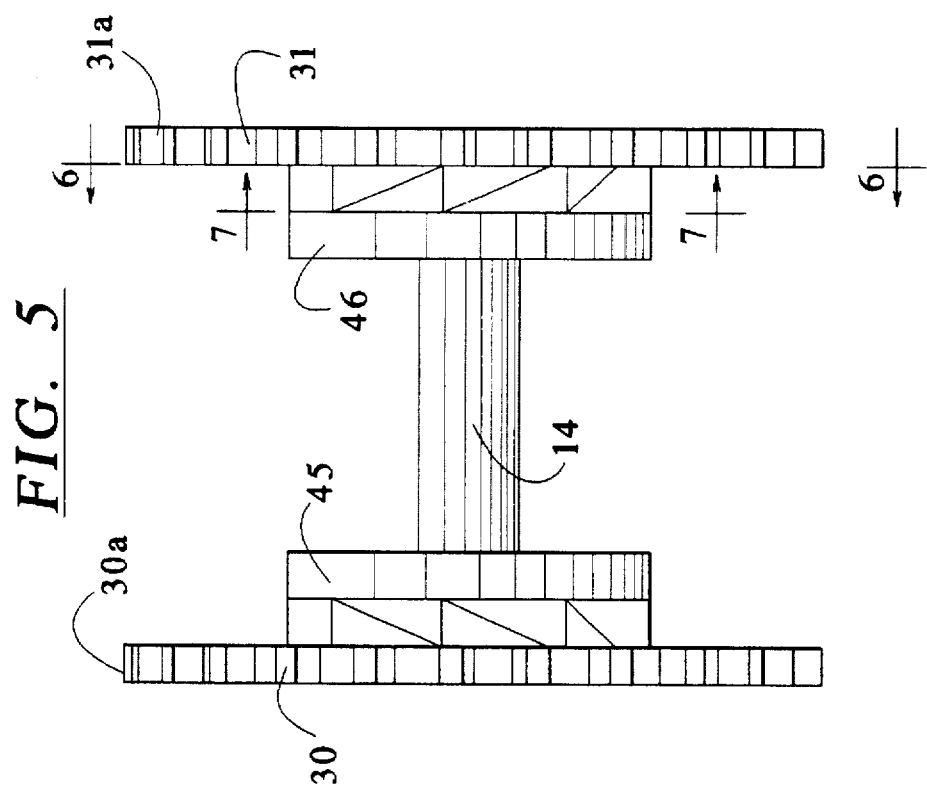

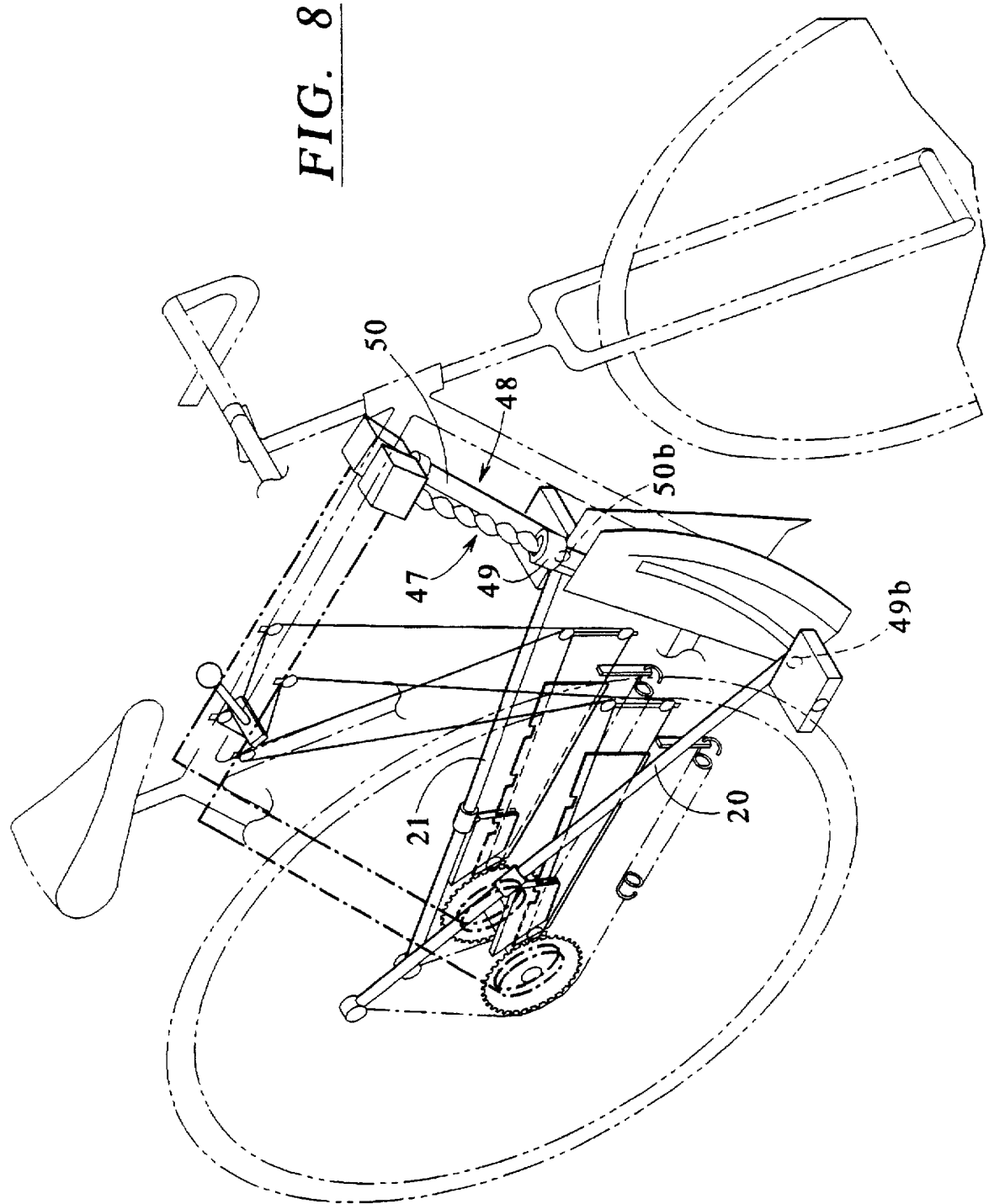

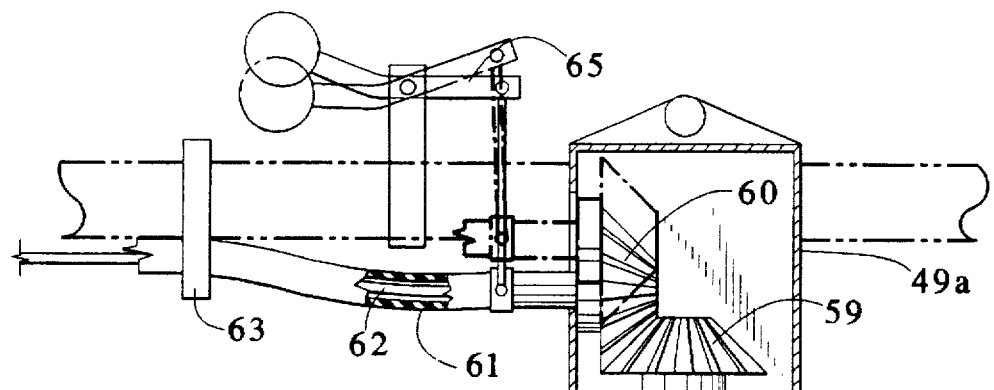
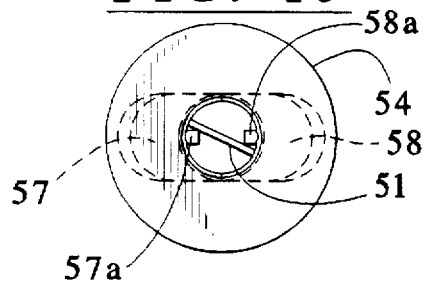
FIG. 10
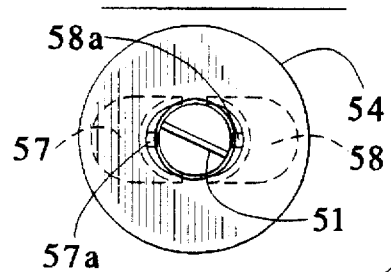
FIG. 11
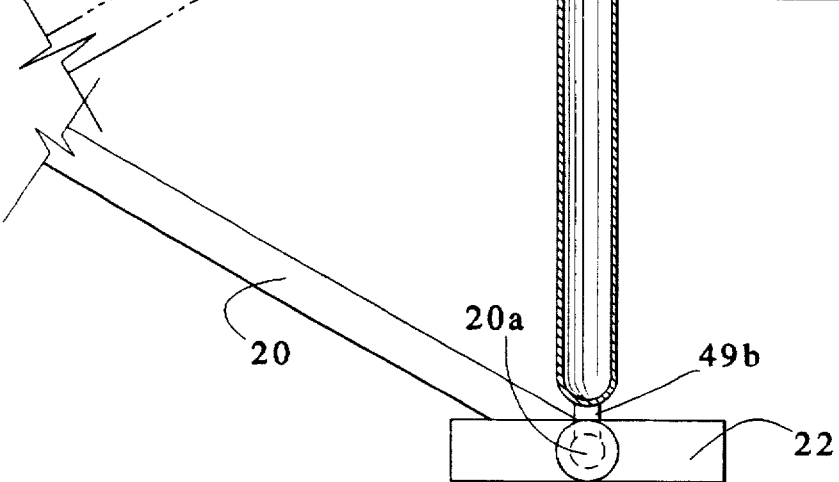
FIG. 9

5,785,337

1

PROPULSION SYSTEM FOR A BICYCLE

BACKGROUND OF THE INVENTION

This invention relates to bicycles and more particularly to an improved propulsion system for powering bicycles.

Bicycles have been a common means of transportation for well over a century. Generally, bicycles are human-powered and provide an efficient means of transportation since expensive fuels are not required. In addition to being popular as a practical means of transportation, bicycles also provide a recreational form of transportation which provides the user with exercise. While bicycles have been extremely popular all over the world for the last century, the basic technology of how a bicycle operates has remained relatively unchanged.

In particular, conventional bicycles include front and rear wheels mounted on front and rear axles and a circular pedaling mechanism mounted generally at a mid-portion of the bicycle. The pedaling mechanism and rear wheel include circular gears and a chain encircles the gears for translating rotational movement of the pedaling mechanism into rotational movement of the rear wheel. Over the last decade or so, the gearing systems for such bicycles have undergone a great deal of technical improvement. However, the basic theory of how a bicycle operates has remained relatively unchanged.

It is therefore believed that it would be an improvement in this art to develop an alternative system to propel a bicycle by human power in a manner that requires less energy, causes less physical fatigue, and is generally more efficient than the propulsion system of conventional bicycles.

SUMMARY OF THE INVENTION

An important aspect of the invention therefore lies in providing a bicycle which includes a propulsion system which allows the cyclist to pedal in an up and down motion so that the cyclist's weight assists in the pedaling operation and reduces the amount of energy required to power the bicycle. In addition, the means for translating the up and down movement of the cyclist into rotational movement of the rear wheel of the bicycle is very efficient so that many revolutions of the rear wheel result from only minimal effort exerted by the cyclist.

The propulsion system of this invention includes a first lever extending along one side of the bicycle frame and a second lever extending along the other side of the bicycle frame. The first and second levers are pivotly mounted to the frame to allow their ends to move in vertical directions. The first ends of the levers include pedals for allowing the cyclist to push the first ends of the levers up and down and to cause them to pivot above their points of securement to the bicycle frame. To propel the bicycle, the propulsion system includes translation means for translating vertical movement of the levers about their pivot points into rotational movement of the rear wheel. In operation, the cyclist pushes up and down on the first and second pedals to cause pivotal movement of the levers and the translation means translates that pivotable movement into rotational movement of the rear wheel of the bicycle.

In one embodiment, the translation means includes linkage members operatively connected to the second ends of the levers and to the frame for engaging and causing rotation of gears mounted on the rear axle of the bicycle. The linkage members include bicycle chain portions for engaging such gears and also include spring portions for accommodating for extension and contraction of the linkage members.

In order to permit the cyclist to vary the resistance of the propulsion system and to vary the amount of drive force translated to the rear wheel of the bicycle, the propulsion system advantageously includes means for moving the location of the pivot points along the first and second levers. When the pivot points are moved closest to the pedals, relatively small movements of the pedals and levers will cause a relatively high degree of rotation of the rear wheel of the bicycle. However, the levers will not provide the cyclist with much leverage and such positioning would most often be used for high speed operation. In contrast, the pivot points may be also moved to a furthermost position from the pedals to provide the cyclist with a relatively large degree of leverage for providing a high degree of torque to the rear wheel for traveling over rough terrain, uphill or the like. The pivot points of the levers may also be moved to intermediate positions for normal cycling conditions.

In another embodiment, the translation means may include drive means operatively connected to the first ends of the levers for translating up and down movement of the first ends of the levers into rotational movement of the rear wheel. The drive means may take the form of screw wrench systems secured to the first ends of the levers and to the bicycle frame. When the cyclist pushes down on the pedals, a helically twisted drive shaft of the system is rotated and a cable is provided for translating that rotation into rotation of the rear wheel. Control means are provided for selectively engaging or disengaging the screw wrench system. It is believed that the screw wrench system does not provide a great deal of torque to the rear wheel but would be advantageous for use at high speeds, such as about 20–30 miles per hour, to take advantage of the movement of the first ends of the levers as well as the second ends.

Other objects, features, and advantages of the present invention will become apparent from the following description and drawings.

BRIEF DESCRIPTION OF THE DRAWINGS

FIG. 4 is a side elevational view of the bicycle and one embodiment of the propulsion system of this invention.

FIG. 5 is a front elevational view of one embodiment of a rear axle of one embodiment of the bicycle and propulsion system of this invention.

FIG. 6 is a side elevational view taken along line 6—6.

FIG. 7 is a side elevational view taken along line 7—7.

FIG. 8 is a perspective view of another embodiment of the bicycle and propulsion system of this invention.

FIG. 9 is a front elevational view of the screw wrench system of the bicycle and propulsion system of the present invention.

FIG. 10 is a top elevational view of the clutch means of the screw in system of the bicycle and propulsion system of the present invention.

FIG. 11 is another top elevational view of the clutch means of the screw in system of the bicycle and propulsion system of the present invention.

DETAILED DESCRIPTION OF THE PREFERRED EMBODIMENTS

Figure 1:
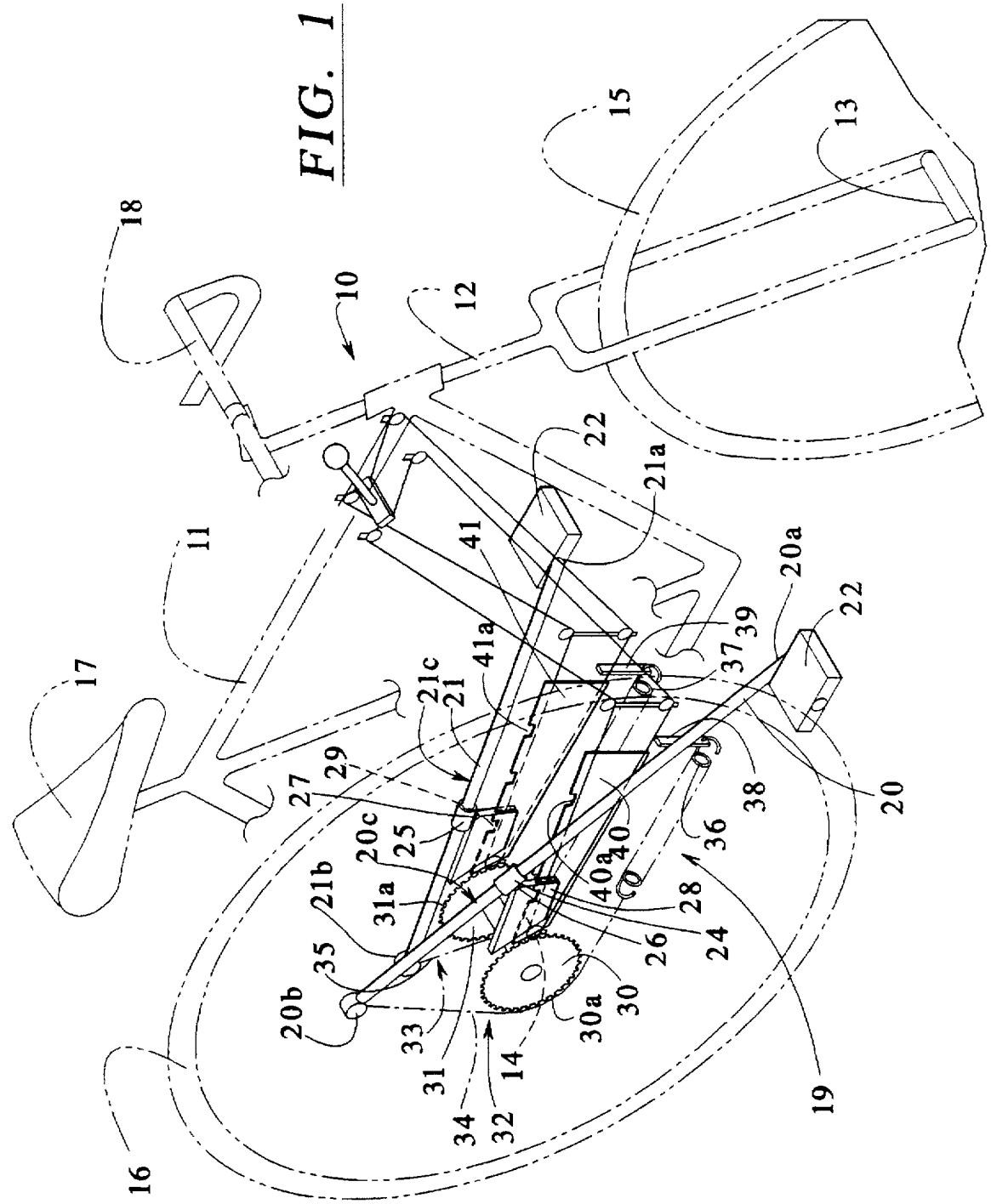
FIG. 1 is a perspective view of a bicycle including one embodiment of the propulsion system of this invention.

Referring to the drawings, the numeral 10 generally designates a bicycle which includes one embodiment of the propulsion system of this invention. Bicycle 10 is shown in outline form to emphasize the propulsion system and includes a conventional bicycle frame 11, a front fork 12, a front axle 13 supported by front fork 12, a rear axle 14 supported by frame 11, a front wheel 15 mounted on front axle 13 and a rear wheel 16 mounted on rear axle 14. Frame 11 also supports a seat 17 for the cyclist to sit on and conventional handlebars 18 for steering the bicycle. The conventional components of bicycle 10 are shown merely for purposes for illustration and it will be understood that bicycle 10 and its conventional components may take a variety of forms depending upon the particular type of bicycle, such as a mountain bike, racing bike, a bike for males or females, bikes for children, etc.

In accordance with this invention, bicycle 10 is provided with the inventive propulsion system of this invention which is generally designated with the numeral 19. The propulsion system 19 includes a first lever 20 having a first end 20a, a second end 20b and a mid-portion 20c and a second lever 21 having a first end 21a, a second end 21b and a mid-portion 21c. The first ends 20a and 21a of levers 20 and 21 are provided with conventional pedals 22 which are rotatably mounted on the ends of the levers by conventional means. In use, the cyclist sits on seat 14 and pushes pedals 22 (and connected levers 20 and 21) up and down to propel the bicycle.

In particular, pivot means are secured to the mid-portions 20c and 21c of the first and second levers 20 and 21 for permitting pedals 22 to be driven or oscillated in generally vertical or up and down directions. In the embodiment shown in the drawings, the pivot means include first and second sleeves 24 and 25 which are respectively secured to the mid-portions 20c and 21c of levers 20 and 21. The sleeves 24 and 25 which slidably receive levers 20 and 21, and pivotable hinge pins 26 and 27 secure sleeves 24 and 25 to bases 28 and 29. The bases 28 and 29 are supported by frame 11 as described in more detail hereinafter. In use, the levers 20 and 21 pivot about their respective pivot means so that the first and second ends of the levers 20 and 21 are movable in vertical directions.

In order to propel the bicycle 10, translation means are provided for translating movement of the first and second levers 20 and 21 into rotational movement of the rear wheel 16. In the embodiment shown in FIGS. 1–4, the translation means includes first and seconds gears 30 and 31 mounted on the opposite ends of rear axle 14 and linkage members generally designated at 32 and 33 for engaging and rotating the gears 30 and 31 when the levers 20 and 21 are oscillated in vertical directions. The linkage members 32 and 33 are attached at one end to the seconds ends 20b and 21b of levers 20 and 21 and have their other ends secured to frame 11. The linkage members 32 and 33 each respectively include bicycle chain portions 34 and 35 for engaging gears 30 and 31 and spring members 36 and 37 which are secured to brackets 38 and 39 on frame 11. The links of bicycle chain portions 34 and 35 are generally shown in outline form but may take the form of any one of a number of well known and commercially available bicycle chains. In any event, the links of the bicycle chain should be capable of engaging the circumferential teeth 30a and 31a of gears 30 and 31 for causing rotational movement of gears 30 and 31 when levers 20 and 21 are moved in up and down directions. When the links of bicycle chain portions 34 and 35 are moved and rotate gears 30 and 31, the springs 36 and 37 appropriately expand and contract to permit such movement. It will also be understood that other suitable linkage members may also be used.

To vary the resistance of the propulsion system and to vary the amount of drive force translated to the rear wheel 16, the propulsion system 11 includes means for moving the pivot means along the length of levers 20 and 21. As shown in FIG. 1, such means may include a pair of ramps 40 and 41 mounted on frame 11. The bases 28 and 29 are slidably moveable along ramps 40 an 41 and sleeves 24 and 25 are also slidable along levers 20 and 21 so that the pivot points of levers 20 and 21 can be adjusted. Each of the ramps 40 and 41 include a plurality of notches 40a and 41a for locking the bases 28 and 29 of the pivot means in selected positions.

To move the pivot means to a desired position, adjustment means are provided for moving the pivot means along the lengths of levers 20 and 21. In the embodiment given in the illustrations and shown most clearly in FIGS. 2–4, such means take the form of cables 42 secured to the bases 28 and 29 of each of the pivot means and an lever 43 for moving the cable 42. As shown, the cable 42 encircles a plurality of pulleys 44 and lever 43 is fixedly secured to cable 42 for moving it along pulleys 44.

Figure 2:
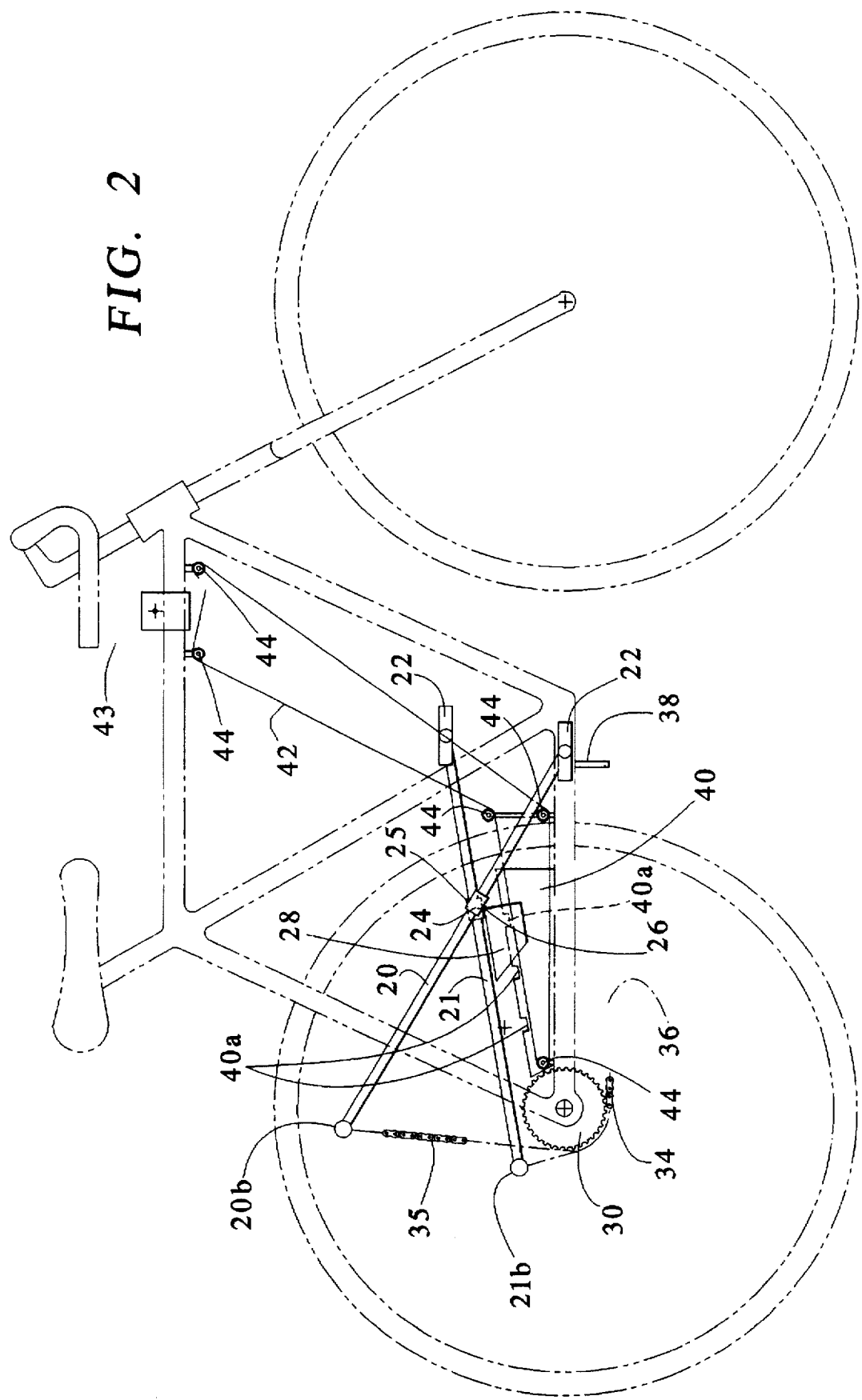
FIG. 2 is a side elevational view of the bicycle and one embodiment of the propulsion of this system of this invention.

Referring to FIG. 2, the lever 43 may be moved to a first position as shown wherein the pivot means move towards the top of ramps 40 and 41 and in a position closest to the pedals 22 which are mounted on levers 20 and 21. In such a position, the close proximity of the pivot means to the pedals 22 provides little leverage for the cyclist to power the bicycle but small movements of the pedals 22 result in significant movement of the second ends 20b and 21b of levers of 20 and 21 and significant rotation of the rear wheel 16. Cyclists would normally move lever 43 to this position for traveling at high speeds.

Figure 3:
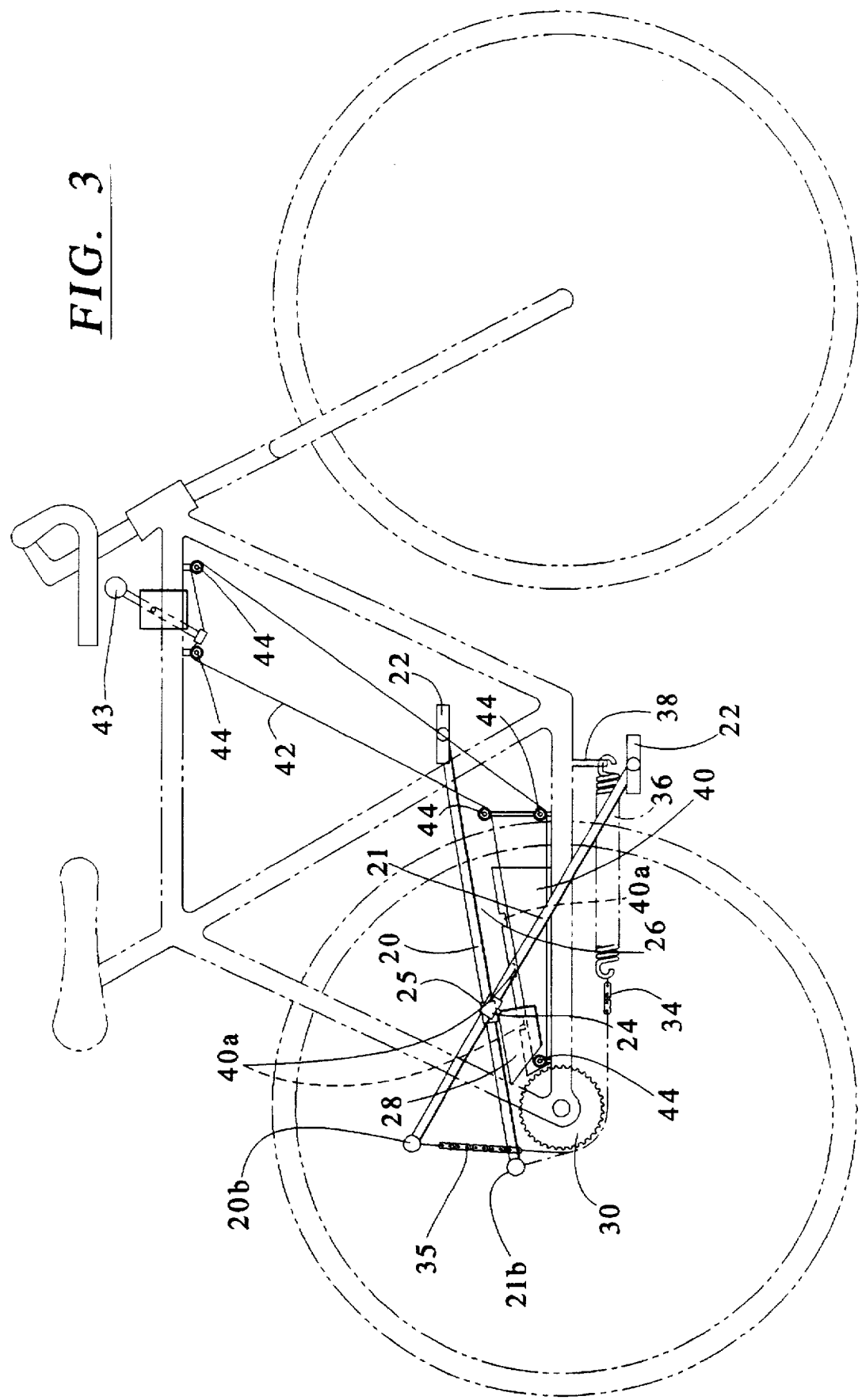
FIG. 3 is a side elevational view of the bicycle and one embodiment of the propulsion system of this invention.
Figure 13:
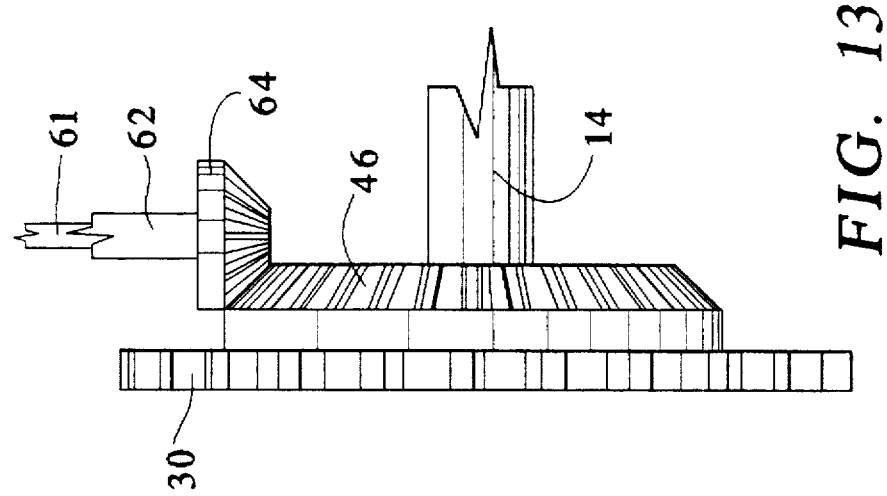
FIG. 13 is a top elevational view of the rear axle shown in FIG. 12.
Figure 12:
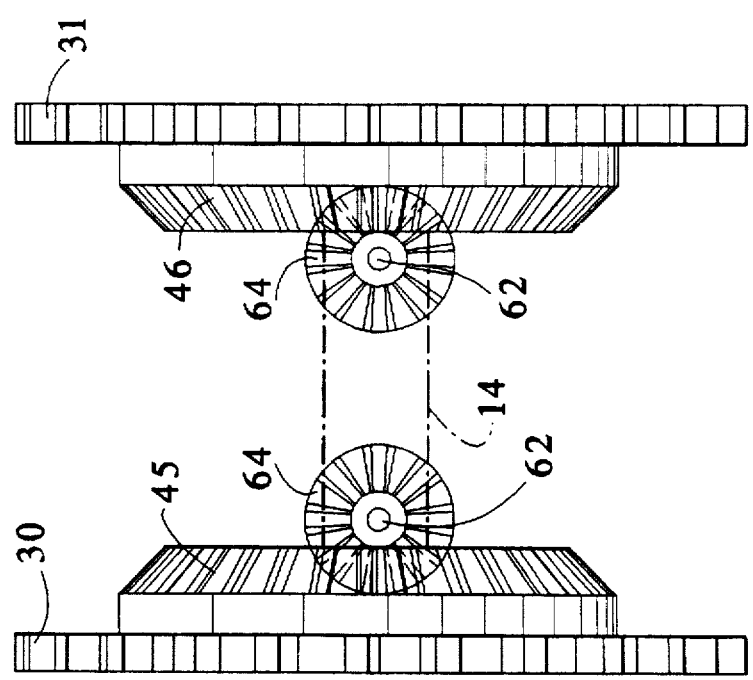
FIG. 12 is a front elevational view of another embodiment of the rear axle of the bicycle and propulsion system of the present invention.

Referring to FIG. 3, the lever 43 is shown in a position at an opposite extreme wherein the pivot means are moved along levers 20 and 21 and ramps 40 and 41 to a furthermost position from pedals 22. In such a position, the distance between the pivot means and the pedals 22 provides the cyclist with significant leverage for moving the seconds ends 20b and 21b of the levers 20 and 21 and rotating the rear wheel 16. While such adjustment provides for easy rotation of the rear wheel, each movement of the pedals does not result significant rotation of the rear wheel 16. Accordingly, such adjustment would be appropriate for low speeds or traveling along difficult or uphill terrain wherein significant leverage is needed to propel the bicycle.

Referring to FIG. 4, lever 43 is shown in an intermediate position wherein the pivot means is moved along ramps 40 and 41 and levers 20 and 21 to an intermediate position. In such a position, the distance between the pivot means and the pedals 22 provides the cyclist with an intermediate amount of leverage and results in an intermediate amount of rotation of the rear wheel 16 when the cyclist pushes on the pedals 22. By moving the lever 43 between these three illustrated positions, the cyclist can adjust the propulsion system for riding uphill, riding during normal conditions, or riding at high speeds. While one particular means for adjusting the propulsion system has been shown for purposes of illustration, it will be understood that other similar mechanisms for moving the pivot points along levers the 20 and 21 may also be utilized in accordance with of this invention.

When the levers 20 and 21 are oscillated in the up and down directions and chain portions 35 and 36 rotate gears 30 and 31, the gears 30 and 31 are necessarily rotated bi-directionally. However, only unidirectional rotation of the rear wheel 16 is desirable. Accordingly, the gears 30 and 31 are operatively connected to means for translating rotational movement of the gears 30 and 31 into only unidirectional rotation of the rear wheel 16. To achieve such results, the gears 30 and 31 may be rotatably mounted on rear axle 14 as shown in FIG. 5 in positions adjacent to third and fourth gears 45 and 46 which are fixedly secured to the rear wheel 16 for rotation therewith. As shown most clearly in FIGS. 6 and 7, the gear 31 includes along its inner face a plurality of slanted teeth 31b which mate with a corresponding plurality of slanted teeth 46a on the inner face of gear 46. The same is true for gears 30 and 45. In use, the gear teeth 31b slip freely against the gear teeth 46a in one direction. However, the gear teeth 31b engage and drive gear teeth 46a, gear 46, and the rear wheel 16 when driven in the opposite direction. Thus, the rear wheel 16 is only driven in a unidirectional fashion while gears 30 and 31 are rotating in both directions. It will also be understood that other mechanisms may be used for translating rotational movement of gears 30 and 31 into unidirectional rotation of rear wheel 16.

Referring to FIGS. 8–13, the translation means may also include drive means connected to the first ends 20a and 21a of levers 20 and 21 for translating vertical movement of the first ends of the levers into rotational movement of the rear wheel 16. In the embodiment shown in the drawings, such drive means take the form of first and second screw wrench systems generally shown at 47 and 48. The screw wrench systems 47 and 48 each include a drive member 49, 50 having their first ends 49a and 50a secured to frame 11 and having their second ends 49b and 50b secured to the first ends 20a and 21b of levers 20 and 21. As the cyclist pushes up and down on pedals 22, the levers 20 and 21 oscillate in up and down directions to cause expansion and contraction of the drive members 49 and 50. The operation of the drive members 49 and 50 are the same and are discussed in more detail with respect to only drive member 49 as shown in more detail in FIG. 9.

Referring to FIG. 9, drive member 49 includes a helically twisted shaft 51 and an elongate tube 52 which is slidable along and receives twisted shaft 51. When the first end 20a of lever 20 is moved in up and down directions, the tube 52 is correspondingly moved up and down along the twisted shaft 51. The top of the tube 52 is provided with clutch means generally designated at 53 for rotating shaft 51 when tube 52 is moved in a downward direction along shaft 51 and for not rotating shaft 51 when tube 52 is moved in an upward direction. In the embodiment shown in the drawings, the clutch means comprises a housing 54 having a pair of internal and downwardly inclined sidewalls 55 and 56. A pair of drive members 57 and 58 are disposed in the housing and are slidable along the inclined side walls 55 and 56 of housing 54. Each drive member 57 and 58 also includes an inward protrusion 57a and 58a. As shown in solid lines in FIG. 9 and in FIG. 11, the drive members 57 and 58 slide along the inclined side walls 55 and 56 to a bottom position when the tube 52 is at a bottom position or is being moved upwards along drive shaft 51. In such a position, the protrusion members 57a and 58a of drive member 57 and 58 do not engage drive shaft 51. However, when the housing 54 is at its uppermost position and the downward stroke is started as shown in phantom in FIG. 9 and in FIG. 10, the drive members 57 and 58 slide upward along inclined faces 55 and 56 of the housing 54 so that projections 57b and 58b project inwardly and engage the helically twisted shaft 51 as shown most clearly in FIG. 10. As the cyclist pushes down on the pedals 22, the projection 57b and 58b cause rotation of the helically twisted shaft 51.

To translate rotational movement of helical shaft 51 into rotational movement of the rear wheel 16, the drive shaft 51 is connected at its top end to a helical gear 59 which in turn drives a cable means for translating rotational movement of the gear 59 into rotational movement of rear wheel 16. In the embodiment given in the illustrations, the cable means includes a helical gear 60 in engagement with helical gear 59, a cable 61 and an interior rotating steel cable 62 secured to gear 60. The cable 61 can be secured to frame 11 by suitable securement means such as straps 63 or the like and extends toward the rear axle 14. As shown most clearly in FIGS. 12 and 13, the opposite ends of the cable 61 include helical gears 64 secured to the interior cables 62 for engaging and rotating gears 45 and 46. The gears 45 and 46 include helical gear teeth 45a and 46a for engaging helical gears 63.

Referring to FIG. 9, the screw wrench systems 47, 48 may also include a lever 65 for selectively engaging or disengaging the screw wrench systems. In particular, the lever 65 may be operatively connected to gear 60 for moving it in and out of engagement with gear 59 of each of the screw wrench systems 47 and 48. It is believed that the disclosed screw wrench systems 47 and 48 will not provide a high degree of torque. However, it is believed that the screw wrench systems 47 and 48 will be highly desirable for high speed situations, such as between 20 and 40 miles per hour, for advantageously utilizing the full movement of the levers 20 and 21 as the cyclist operates the pedals 22.

While in the foregoing specification embodiments of the present invention have been disclosed in considerable detail for purposes of illustration, it will be understood by those skilled in the art that many of the details given herein may vary considerably within the spirit and scope of the invention.

I claim:

1. A bicycle having a frame, first and second axles mounted on said frame, front and rear wheels mounted on said first and second axles, and propulsion means for rotating said rear wheel, said propulsion means comprising:

a first lever extending along one side of said frame and having a first end, a second end, and a mid-portion;

a second lever extending along the other side of said frame and having a first end, a second end, and a mid-portion;

pivot means generally secured to the mid-portions of said first and second levers for pivotally mounting said first and second levers on said frame so that the first and second ends of said levers are moveable in vertical directions about said pivot means;

first and second pedals mounted on said first ends of said first and second levers, respectively;

translation means for translating vertical movement of said levers about said pivot means into rotational movement of said rear wheel, whereby when a cyclist pushes up and down on said first and second pedals, said rear wheel is rotated to drive the bicycle; and adjustment means for moving the pivot means along the lengths of said first and second levers.

2. The bicycle of claim 1 in which said pivot means includes first and second sleeves for slidably receiving said first and second levers, respectively, first and second bases secured to said frame, and first and second pivotal hinges for securing said first and second sleeves to said first and second bases, said first and second bases being slidably mounted along inclined first and second ramps on said frame, said adjustment means comprising cable means secured to said first and second bases for slidably moving said first and second bases and said pivot means along said first and second inclined ramps.

3. The bicycle of claim 2 in which said first and second ramps include a plurality of notches for locking said first and second bases of said pivot means in selected positions.

4. The bicycle of claim 3 in which said cable means comprises cable loops mounted on a plurality of pulleys with said cable loops being secured at one point to said first and second bases and at another point to a moveable lever, whereby, movement of said moveable lever causes movement of said cable loops about said pulleys and causes movement of said bases of said pivot means along said first and second ramps.

5. A bicycle having a frame, first and second axles mounted on said frame, front and rear wheels mounted on said first and second axles, and propulsion means for rotating said rear wheel, said propulsion means comprising:

a first lever extending along one side of said frame and having a first end, a second end, and a mid-portion;

a second lever extending along the other side of said frame and having a first end, a second end, and a mid-portion;

pivot means generally secured to the mid-portions of said first and second levers for pivotally mounting said first and second levers on said frame so that the first and second ends of said levers are moveable in vertical directions about said pivot means;

first and second pedals mounted on said first ends of said first and second levers, respectively;

translation means for translating vertical movement of said levers about said pivot means into rotational movement of said rear wheel, whereby when a cyclist pushes up and down on said first and second pedals, said rear wheel is rotated to drive the bicycle;

drive means connected to said first ends of said first and seconds levers and to said frame for translating vertical movement of said first ends of said levers into rotational movement of said rear wheel; and said drive means comprising a first screw wrench having one end connected to said first end of said first lever and having another end secured to said frame and a second screw wrench having a first end connected to said first end of said second lever and a second end secured to said frame.

6. The bicycle of claim 5 in which each of said screw wrenches includes a helically twisted drive shaft, an elongate tube which is slidable along said drive shaft, and clutch means secured to a top of said tube for selectively engaging said drive shaft.

7. The bicycle of claim 6 in which said clutch means of each of said screw wrenches operates to rotate said drive shaft when said first end of said lever and said tube is moved in downward directions and operates not to rotate said drive shaft when said first end of said lever and said tube is moved in upward directions.

8. The bicycle of claim 7 in which said clutch means comprises a housing secured to said top of said tube, said housing including a pair of internal side walls which are angled outwardly in the downward direction and a pair of drive members which are slidable along with said angled side walls, said drive members each having protrusion members, whereby, when said tube is pushed in a downward direction, said drive members ride up on said angled side walls such that said protrusion members engage and rotate said drive shaft and when said tube is pushed in an upward direction, said drive members fall along said inclined side walls such that said protrusion members are brought out of engagement with said drive shaft.

9. The bicycle of claim 6 in which each of said helically twisted drive shafts include a drive gear and transmission means are operatively connected to said drive gears for translating rotational movement of said drive shafts and said drive gears into rotational movement of said rear wheel.

10. The bicycle of claim 9 in which said transmission means includes secondary drive gears in engagement with said drive gears of said helically twisted drive shafts and a drive cable connected to said secondary gears.

11. The bicycle of claim 10 in which said drive cables include an outer cable and an interior rotatable steel cable.

12. The bicycle of claim 10 in which means are provided for selectively moving said secondary gears into and out of engagement with said drive gears of said helically twisted drive shafts for allowing the cyclist to selectively engage or disengage said first and second screw wrenches.

\* \* \* \* \*